(12) United States Patent
Hara

(10) Patent No.: US 10,771,454 B2
(45) Date of Patent: Sep. 8, 2020

(54) INFORMATION PROCESSING SYSTEM AND INFORMATION PROCESSING METHOD

(71) Applicant: KYOCERA DOCUMENT SOLUTIONS INC., Osaka (JP)

(72) Inventor: Takehiro Hara, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 151 days.

(21) Appl. No.: 16/048,203

(22) Filed: Jul. 27, 2018

(65) Prior Publication Data

US 2019/0036902 A1 Jan. 31, 2019

(30) Foreign Application Priority Data

Jul. 31, 2017 (JP) .................................. 2017-147755

(51) Int. Cl.
| | | |
|---|---|---|
| *H04L 29/06* | (2006.01) | |
| *G06F 21/31* | (2013.01) | |
| *G06F 21/60* | (2013.01) | |

(52) U.S. Cl.
CPC ............ *H04L 63/083* (2013.01); *G06F 21/31* (2013.01); *G06F 21/604* (2013.01); *H04L 63/0884* (2013.01); *G06F 2221/2117* (2013.01); *H04L 63/0281* (2013.01)

(58) Field of Classification Search
CPC ............... H04L 63/083; H04L 63/0884; H04L 63/0281; G06F 21/31604; G06F 2221/2117

USPC ............................................................ 726/7
See application file for complete search history.

(56) References Cited

U.S. PATENT DOCUMENTS

| | | | |
|---|---|---|---|
| 8,966,598 B2* | 2/2015 | Brink ...................... | H04L 63/10 |
| | | | 726/12 |
| 2003/0033520 A1* | 2/2003 | Peiffer ..................... | H04L 29/06 |
| | | | 713/153 |
| 2007/0256118 A1* | 11/2007 | Nomura .............. | H04L 12/2807 |
| | | | 726/3 |
| 2018/0007049 A1* | 1/2018 | Palki .................... | H04L 63/0861 |
| 2018/0373853 A1* | 12/2018 | Minami .................. | G06F 21/31 |

FOREIGN PATENT DOCUMENTS

JP          2002-149908 A          5/2002

* cited by examiner

*Primary Examiner* — Khalil Naghdali
(74) *Attorney, Agent, or Firm* — Li & Cai Intellectual Property (USA) Office

(57) ABSTRACT

An information processing system comprises a terminal device; an end server; and an intermediate server connected to the terminal device and the end server via a network. The intermediate server includes a communication device that communicates with the terminal device and the end server; a memory device that stores an ID correspondence table that registers a combination of first login information and second login information, the first login information being for logging in to the intermediate server, the second login information being for logging in to the end server; and a controller, when the controller executes an information processing program, the controller operating as an ID issue receiving unit, an end server accessing unit, an ID issuing unit, and an end server access receiving unit.

4 Claims, 7 Drawing Sheets

| Intermediate server ID | Intermediate server password | End server ID | End server password |
|---|---|---|---|
|  |  |  |  |
|  |  |  |  |
|  |  |  |  |
| ⋮ | ⋮ | ⋮ | ⋮ |

17a: ID correspondence table

FIG.4

INFORMATION PROCESSING SYSTEM AND INFORMATION PROCESSING METHOD

CROSS REFERENCE TO RELATED APPLICATION

This application claims the benefit of Japanese Priority Patent Application JP 2017-147755 filed Jul. 31, 2017, the entire contents of which are incorporated herein by reference.

BACKGROUND OF THE INVENTION

1. Field of the Invention

The present disclosure relates to an information processing system including servers of a plurality of layers, and an information processing method of authorizing a user by the information processing system.

2. Description of Related Art

Typically, in a system including a plurality of layers, in order to make a structure simple, a common user ID (Identifier) is used for an intermediate server and an end server.

SUMMARY OF THE INVENTION

It is desirable to improve the security of a system including servers of a plurality of layers.

According to an embodiment of the present disclosure, there is provided an information processing system, including:
a terminal device;
an end server; and
an intermediate server connected to the terminal device and the end server via a network,
the intermediate server including
  a communication device that communicates with the terminal device and the end server,
  a memory device that stores an ID correspondence table that registers a combination of first login information and second login information, the first login information being for logging in to the intermediate server, the second login information being for logging in to the end server, and
  a controller,
when the controller executes an information processing program, the controller operating as
  an ID issue receiving unit that receives an issue application by using the second login information, the issue application being an application for issuing the first login information for logging in to the intermediate server by the terminal device,
  an ID issuing unit that
    issues the first login information on a basis of the issue application, and
    registers the issued first login information and the second login information provided from the terminal device in the ID correspondence table in a one-to-one correspondence,
  an end server accessing unit that accesses the end server by using the second login information provided from the terminal device, and
  an end server access receiving unit that
    receives an access request from the terminal device, the access request requesting to access the end server by using the first login information and the second login information, and
    if a combination of the first login information and the second login information in the access request is registered in the ID correspondence table, causes the end server accessing unit to access the end server.

According to an embodiment of the present disclosure, there is provided an information processing method executed by an information processing system including a terminal device, an end server, and an intermediate server connected to the terminal device and the end server via a network, the information processing method including:
by a controller of the intermediate server,
receiving an issue application by using a second login information, the issue application being an application for issuing a first login information, the first login information being for logging in to the intermediate server by the terminal device, the second login information being for logging in to the end server;
issuing the first login information on a basis of the issue application;
  registering a combination of the issued first login information and the second login information provided from the terminal device in the ID correspondence table in a one-to-one correspondence;
receiving an access request from the terminal device, the access request requesting to access the end server by using the first login information and the second login information; and
if a combination of the first login information and the second login information in the access request is registered in the ID correspondence table, accessing the end server.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 4 shows an example of the ID correspondence table 17a;

DETAILED DESCRIPTION OF THE PREFERRED EMBODIMENTS

Hereinafter, an embodiment of the present disclosure will be described with reference to the drawings.

1. Entire Configuration

Figure 1:
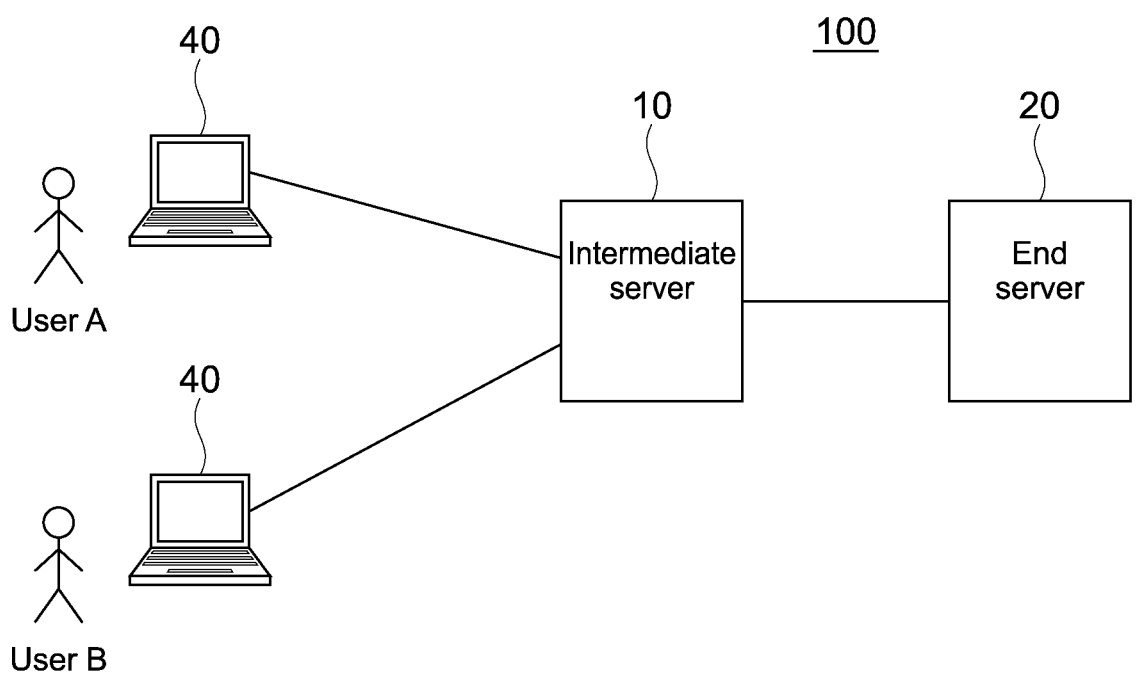
FIG. 1 shows an entire configuration of the information processing system 100 according to an embodiment of the present disclosure.

Firstly, an entire configuration of the information processing system 100 according to an embodiment of the present disclosure will be described. FIG. 1 shows an entire configuration of the information processing system 100 according to an embodiment of the present disclosure.

The information processing system 100 includes the plurality of terminal devices 40, the end server 20, and the intermediate server 10 connected to the terminal device 40 and the end server 20 via a network.

In order to access the end server 20, each of the user A and the user B accesses the API (Application Programming Interface) of the intermediate server 10 by using the terminal device 40 of each user, logs in to the intermediate server 10, and then accesses the API of the end server 20 via the intermediate server 10.

An entire configuration of the information processing system 100 according to an embodiment of the present disclosure has been described above.

2. Processing Example of Typical Technique

Next, as a comparison to the present embodiment, a method of accessing an intermediate server and an end server according to a typical technique will be described.

Firstly, the user A accesses the API of the intermediate server, and applies for issuing login information for the user A.

Next, the intermediate server issues login information for the user A. At this time, the intermediate server does not check information about an end server when the intermediate server issues the login information for the user A.

Next, the user A accesses the API of the intermediate server by using the login information for the user A for logging in to the intermediate server and the login information for the user A for logging in to the end server.

The login information for the user A for logging in to the intermediate server is appropriate. So the user A is successful in logging in to the intermediate server. Next, the intermediate server logs in to the API of the end server by using the login information for the user A for logging in to the end server.

The login information for the user A for logging in to the end server is appropriate. So the user A is successful in logging in to the end server.

The intermediate server supplies information, which indicates that logging in to the end server is successful, to the user A.

Meanwhile, the user B accesses the API of the intermediate server by using the login information for the user A for logging in to the intermediate server and the login information for the user B for logging in to the end server.

The login information for the user A for logging in to the intermediate server is inappropriate. However, the intermediate server cannot check the login information. So the user B is successful in logging in to the intermediate server by using the login information for the user A for logging in to the intermediate server. Next, the intermediate server logs in to the API of the end server by using the login information for the user B for logging in to the end server.

The login information for the user B for logging in to the end server is appropriate. So the user B is successful in logging in to the end server.

The intermediate server supplies information, which indicates that login to the end server is successful, to the user B.

As described above, the user B does not have login information for logging in to the intermediate server appropriately issued for the user B. However, by using the login information for the user A for logging in to the intermediate server, the user B is capable of accessing the end server, which is a problem.

A method of accessing an intermediate server and an end server of a typical technique has been described above.

3. Processing Example of the Present Embodiment

Figure 2:
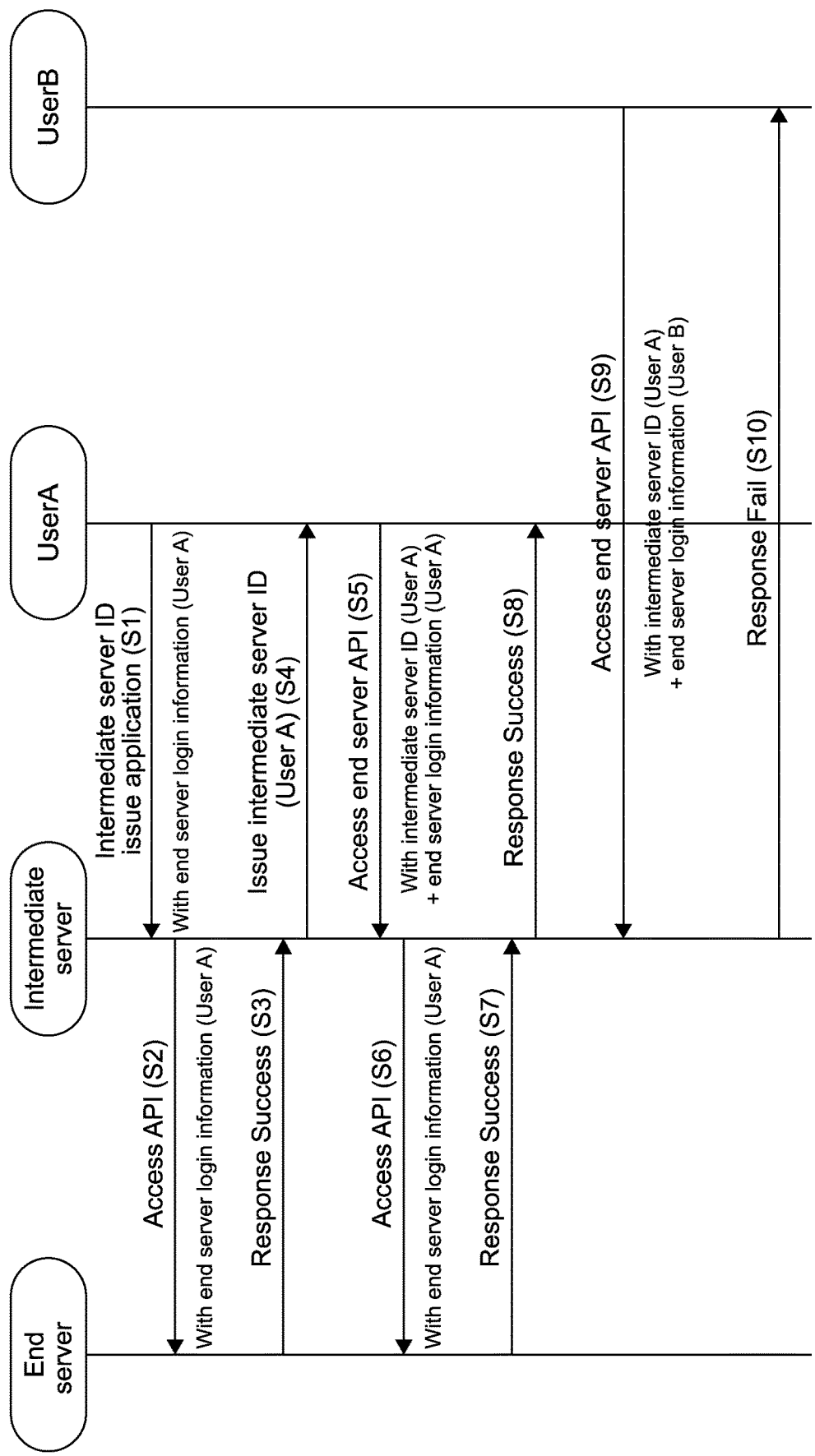
FIG. 2 shows a method of accessing the intermediate server 10 and the end server 20 of the present embodiment.

Next, in order to compare with a typical technique, a method of accessing the intermediate server 10 and the end server 20 of the present embodiment will be described. FIG. 2 shows a method of accessing the intermediate server 10 and the end server 20 of the present embodiment.

Firstly, the user A accesses the API of the intermediate server 10, and sends an issue application for issuing login information for the user A for logging in to the intermediate server 10 (Step S1). Note that, at this time, the user A provides login information for the user A for logging in to the end server 20 to the intermediate server 10.

Next, the intermediate server 10 accesses the API for logging in to the end server 20 by using the login information for the user A for logging in to the end server 20 provided from the user A. The intermediate server 10 confirms whether or not the intermediate server 10 can log in to the end server 20 actually (Step S2).

If the login information for the user A for logging in to the end server 20 is appropriate, the end server 20 sends a login success response to the intermediate server 10 (Step S3).

If the intermediate server 10 receives the login success response from the end server 20, the intermediate server 10 issues login information for the user A for logging in to the intermediate server 10. The intermediate server 10 stores the login information for the user A for logging in to the intermediate server 10 and the login information for the user A for logging in to the end server 20 in a one-to-one relation (Step S4).

Next, by using the login information for the user A for logging in to the intermediate server 10 and the login information for the user A for logging in to the end server 20, the user A accesses the API of the intermediate server 10 (Step S5).

Next, the intermediate server 10 checks whether or not the combination of the login information for the user A for logging in to the intermediate server 10 and the login information for the user A for logging in to the end server 20 provided from the user A is stored. If the combination is stored, login to the intermediate server 10 is successful. The intermediate server 10 logs in to the API of the end server 20 by using the login information for the user A for logging in to the end server 20 (Step S6).

If the login information for the user A for logging in to the end server 20 is appropriate, login to the end server 20 is successful (Step S7).

The intermediate server 10 sends information indicating that login to the end server 20 is successful to the user A (Step S8).

Meanwhile, by using the login information for the user A for logging in to the intermediate server 10 and the login information for the user B for logging in to the end server 20, the user B accesses the API of the intermediate server 10 (Step S9).

Next, the intermediate server 10 checks whether or not the combination of the login information for the user A for logging in to the intermediate server 10 and the login information for the user B for logging in to the end server 20 provided from the user B is stored. If the combination is not stored, the access is refused, i.e., failed (Step S10).

A method of accessing the intermediate server 10 and the end server 20 of the present embodiment has been described above. As described above, even if the login information for the user A for logging in to the intermediate server 10 is leaked to the user B, the user B cannot access the end server 20 by using the combination of the login information for the user A for logging in to the intermediate server 10 and the login information for the user B for logging in to the end server 20. As a result, it is possible to reduce security risks. Further, since the login information for logging in to the intermediate server 10 and the login information for logging in to the end server 20 are in association with each other, it is possible to execute access management without difficulty.

4. Configuration of Intermediate Server

Figure 3:
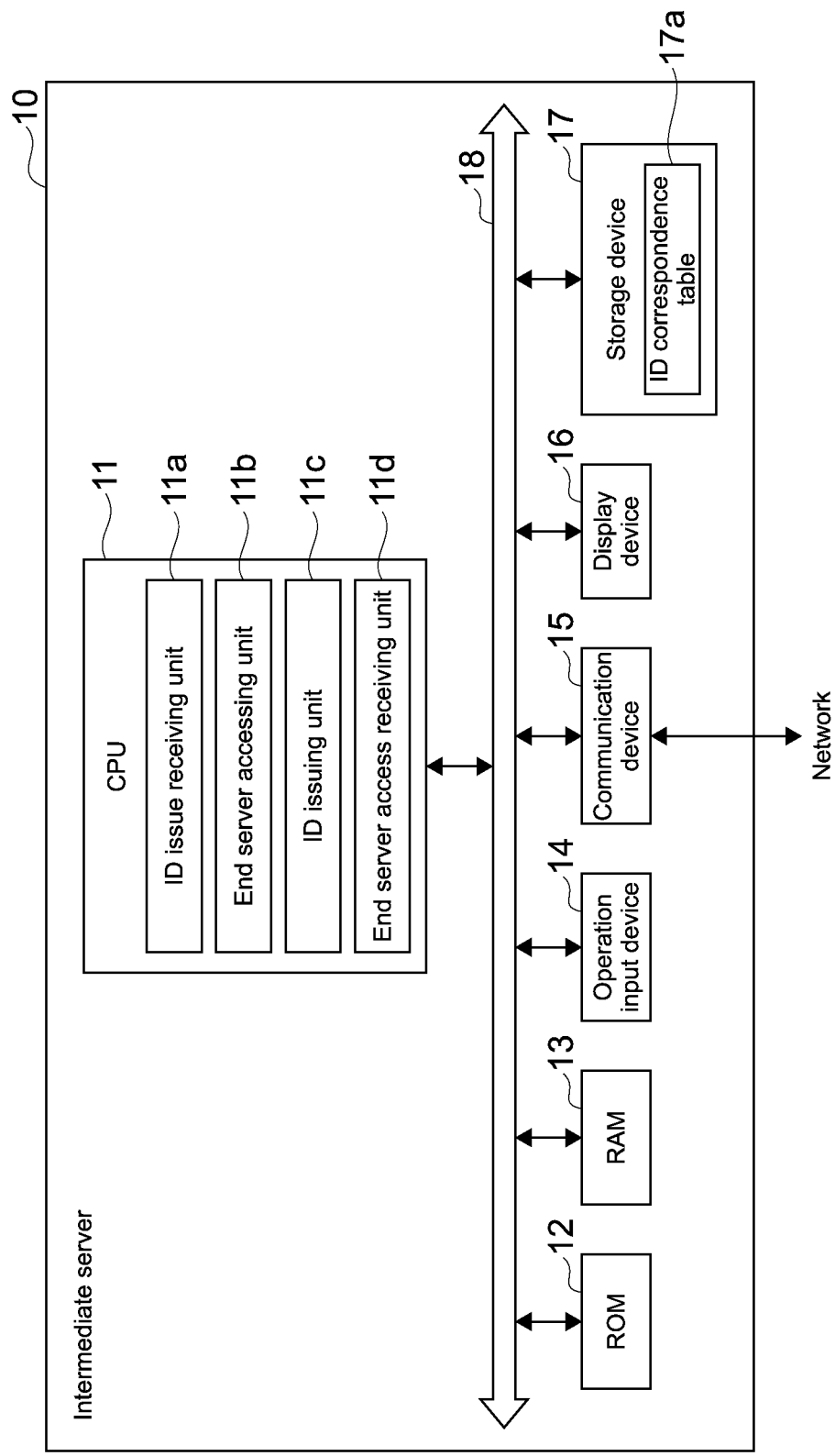
FIG. 3 shows a block configuration of the intermediate server 10.

Next, a configuration of the intermediate server 10 will be described. The intermediate server 10 may include dedicated hardware or software or a general-purpose computer. FIG. 3 shows a block configuration of the intermediate server 10.

As shown in FIG. 3, the intermediate server 10 includes a CPU (Central Processing Unit) 11, a ROM (Read Only Memory) 12, a RAM (Random Access Memory) 13, an operation input device 14, a communication device 15, a display device 16, and a storage device 17, and these blocks are connected to each other via a bus 18.

The ROM 12 stores a plurality of programs such as firmware for executing various types of process, and data. The RAM 13 is used as a work area of the CPU 11 and temporarily stores an OS (Operating System), various applications being executed, and various types of data being processed.

The storage device 17 is, for example, an HDD (Hard Disk Drive), a flash memory, or other nonvolatile memories. The storage device 17 stores the OS, various applications, various types of data, and the ID correspondence table 17a.

As shown in FIG. 4, the ID correspondence table 17a records combinations each including login information (first login information) including a certain login ID and a certain password of the intermediate server 10 and certain login information (second login information) of the end server 20 in a one-to-one correspondence.

The communication device 15 is connected to a network for sending/receiving information to/from the terminal device 40, the end server 20, and the like connected to the network.

Of the plurality of programs stored in the ROM 12 or the storage device 17, the CPU 11 loads a program in the RAM 13 in response to a command input via the operation input device 14, and appropriately controls the display device 16 and the storage device 17 according to the loaded program.

The operation input device 14 is, for example, a pointing device such as a mouse, a keyboard, a touch panel, or other operation devices.

The display device 16 is, for example, a liquid crystal display, an EL (Electro-Luminescence) display, or a plasma display.

Next, functional blocks will be described. When the CPU 11 of the management server 10 executes a program, the CPU 11 operates as the functional blocks described below.

The functional blocks that the CPU 11 of the management server 10 realizes include the ID issue receiving unit 11a, the end server accessing unit 11b, the ID issuing unit 11c, and the end server access receiving unit 11d.

The ID issue receiving unit 11a receives an issue application by using the login information for logging in to the end server 20, the issue application being an application for issuing login information for logging in to the intermediate server 10 by the terminal device 40, which is used by a user, via the API.

The end server accessing unit 11b accesses the end server 20 by using the login information for logging in to the end server 20 provided from the user.

If the ID issue receiving unit 11a receives the issue application for login information, the ID issuing unit 11c causes the end server accessing unit 11b to log in to the end server 20. If login is successful, the ID issuing unit 11c issues the login information for logging in to the intermediate server 10. The ID issuing unit 11c registers the issued login information for logging in to the intermediate server 10 and the login information for logging in to the end server 20 provided from a user in the ID correspondence table 17a in a one-to-one correspondence.

The end server access receiving unit 11d receives an access request via the API from the terminal device 40, which is used by a user, the access request requesting to access the end server 20 by using the login information for logging in to the intermediate server 10 and the login information for logging in to the end server 20. Only if a combination of the login information used in the access request is registered in the ID correspondence table 17a, the end server access receiving unit 11d causes the end server accessing unit 11b to access the end server 20.

A configuration of the intermediate server 10 has been described above.

5. Configuration of End Server

Figure 5:
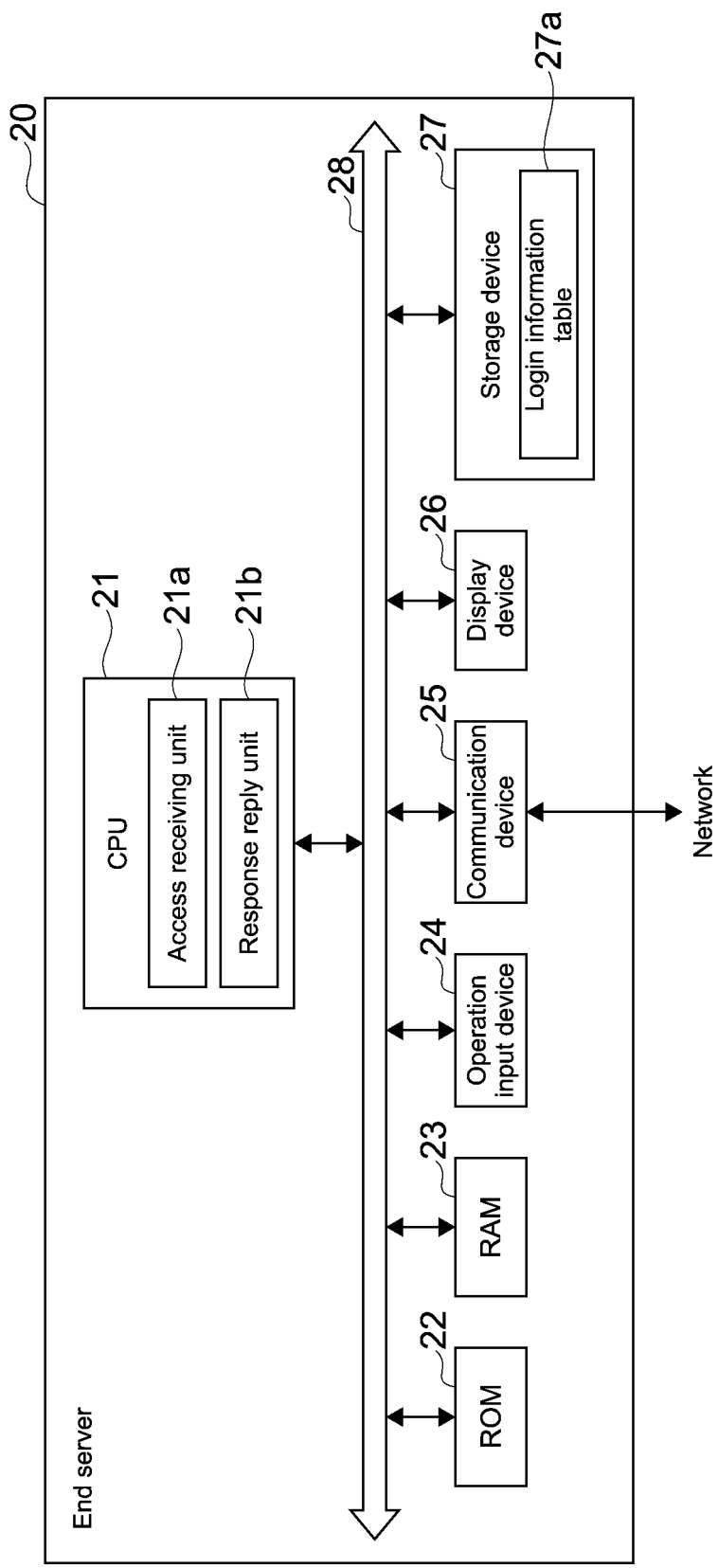
FIG. 5 shows a block configuration of the end server 20.

Next, a configuration of the end server 20 will be described. The end server 20 may include dedicated hardware or software or a general-purpose computer. FIG. 5 shows a block configuration of the end server 20.

As shown in FIG. 5, the end server 20 includes a CPU 21, a ROM 22, a RAM 23, an operation input device 24, a communication device 25, a display device 26, and a storage device 27, and these blocks are connected to each other via a bus 28.

The ROM 22 stores a plurality of programs such as firmware for executing various types of process, and data. The RAM 23 is used as a work area of the CPU 21 and temporarily stores an OS, various applications being executed, and various types of data being processed.

The storage device 27 is, for example, an HDD, a flash memory, or other nonvolatile memories. The storage device 27 stores the OS, various applications, various types of data, and the login information table 27a. The login information table 27a stores login information including a login ID and a password.

The communication device 15 is connected to a network for sending/receiving information to/from the intermediate server 10 and the like connected to the network.

Of the plurality of programs stored in the ROM 22 or the storage device 27, the CPU 21 loads a program in the RAM 23 in response to a command input via the operation input device 24, and appropriately controls the display device 26 and the storage device 27 according to the loaded program.

The operation input device 24 is, for example, a pointing device such as a mouse, a keyboard, a touch panel, or other operation devices.

The display device 26 is, for example, a liquid crystal display, an EL (Electro-Luminescence) display, or a plasma display.

Next, functional blocks will be described. When the CPU 21 of the end server 20 executes a program, the CPU 21 operates as the functional blocks described below.

The functional blocks that the CPU 11 of the management server 10 realizes include the access receiving unit 21a and the response reply unit 21b.

The access receiving unit 21a receives a request to access by using login information via the API from the intermediate server 10. The access receiving unit 21a checks the login information against login information registered in the login information table 27a for authorization.

The response reply unit 21b sends a message, which indicates that login is successful or failed, in response to the access request from the intermediate server 10.

A configuration of the end server 20 has been described above.

6. Processing Flow of Issuing ID

Figure 6:
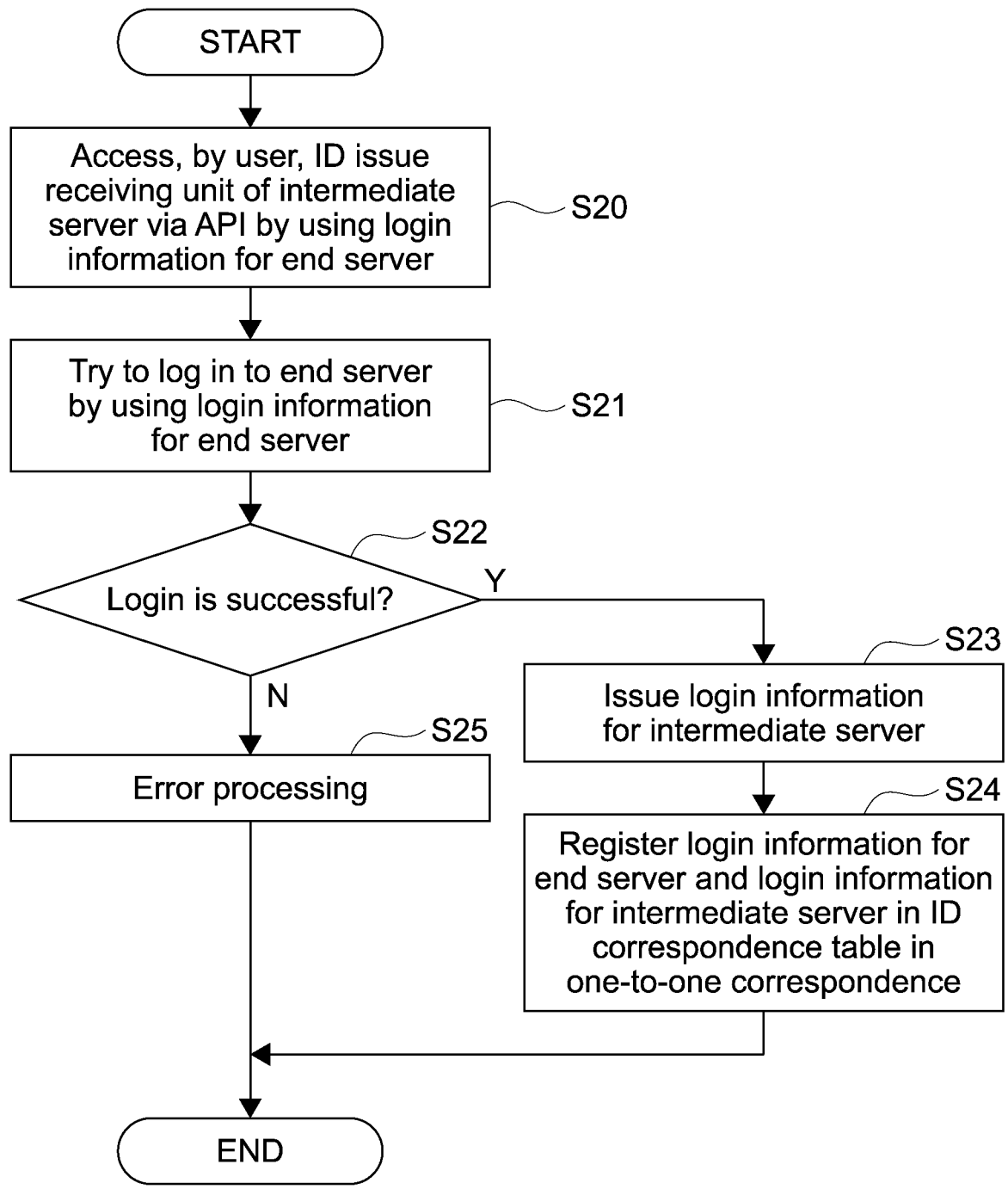
FIG. 6 shows a processing flow of issuing, by the information processing system 100, login information for logging in to the intermediate server 10.

Next, a processing flow of issuing, by the information processing system 100, login information (login ID, etc.) for logging in to the intermediate server 10 will be described. FIG. 6 shows a processing flow of issuing, by the information processing system 100, login information for logging in to the intermediate server 10.

Firstly, the terminal device 40, which is used by a user, accesses the ID issue receiving unit 11a of the intermediate server 10 via the API by using the login information for logging in to the end server 20 (Step S20).

Next, the end server accessing unit 11b tries to log in to the end server 20 by using the login information for logging in to the end server 20 received from the ID issue receiving unit 11a (Step S21).

Next, the end server accessing unit 11b determines whether or not login to the end server 20 is successful (Step S22).

If login is successful (Step S22, Y), the ID issuing unit 11c issues login information for logging in to the intermediate server 10 (Step S23).

Next, the ID issuing unit 11c registers the login information for logging in to the end server 20 provided from the user and the newly-issued login information for logging in to the intermediate server 10 in the ID correspondence table 17a in a one-to-one correspondence, and finishes the process (Step S24).

If login is failed (Step S22, N), error processing is executed and the process is finished (Step S25).

A processing flow of issuing, by the information processing system 100, login information for logging in to the intermediate server 10 has been described above.

7. Processing Flow of Accessing End Server

Figure 7:
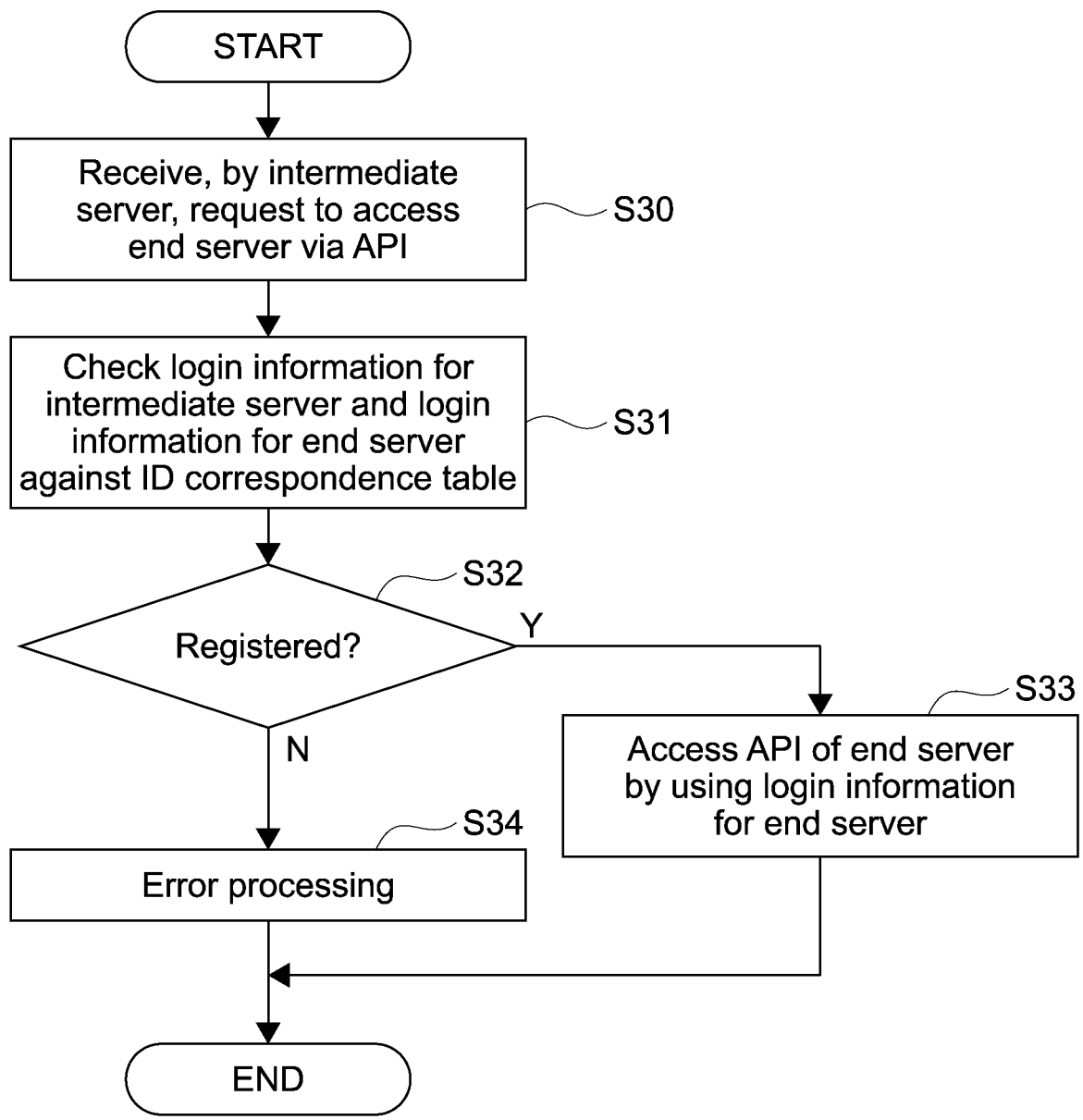
FIG. 7 shows a processing flow of accessing the end server 20 via the intermediate server 10 from the terminal device 40, which is used by a user.

Next, a processing flow of accessing the end server 20 via the intermediate server 10 from the terminal device 40, which is used by a user, will be described. FIG. 7 shows a processing flow of accessing the end server 20 via the intermediate server 10 from the terminal device 40, which is used by a user.

Firstly, the end server access receiving unit 11d of the intermediate server 10 receives a request to access the end server 20 via the API from the terminal device 40, which is used by a user, by using the login information for logging in to the intermediate server 10 and the login information for logging in to the end server 20 (Step S30).

Next, the end server access receiving unit 11d checks the provided login information for logging in to the intermediate server 10 and the provided login information for logging in to the end server 20 against the ID correspondence table 17a. The end server access receiving unit 11d checks whether or not the combination of the login information is registered in the ID correspondence table 17a (Step S31).

Next, the end server access receiving unit 11d determines whether or not the combination is registered (Step S32).

If the combination is registered (Step S32, Y), the end server accessing unit 11b accesses the API of the end server 20 by using the provided login information for logging in to the end server 20 (Step S33).

If the combination is not registered (Step S32, N), error processing is executed (Step S34)

A processing flow of accessing the end server 20 via the intermediate server 10 from the terminal device 40, which is used by a user, has been described above.

8. Conclusion

Typically, in a system including a plurality of layers, in order to make a structure simple, a common user ID (Identifier) is used for an intermediate server and an end server, in many cases.

Meanwhile, in another case, different IDs are used for an intermediate server and an end server in order to configure a system flexibly. However, in this case, if an ID for an intermediate server and an ID for an end server are issued for a user A, a user B, who only has an ID for the end server, may log in to the intermediate server by plagiarizing the ID for the intermediate server of the user A and then access the end server.

To the contrary, according to the present embodiment, even if the login information for the user A for logging in to the intermediate server 10 is leaked to the user B, the user B cannot access the end server 20 by using the combination of the login information for the user A for logging in to the intermediate server 10 and the login information for the user B for logging in to the end server 20. As a result, it is possible to reduce security risks. Further, since the login information for logging in to the intermediate server 10 and the login information for logging in to the end server 20 are in association with each other, it is possible to execute access management without difficulty.

As a result, it is possible to improve the security of a system including servers of a plurality of layers.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing system, comprising:
a terminal device;
an end server; and
an intermediate server connected to the terminal device and the end server via a network, the intermediate server including
a communication device that communicates with the terminal device and the end server,
a memory device that stores an ID correspondence table that registers a combination of first login information and second login information, the first login information being for logging in to the intermediate server, the second login information being for logging in to the end server, and
a controller, when the controller executes an information processing program, the controller operating as an ID issue receiving unit that receives an issue application using the second login information from the terminal device, the issue application being an application for issuing the first login information for accessing an API (Application Programming Interface) of the intermediate server and logging in to the intermediate server by the terminal device, an end server accessing unit that,
when the ID issue receiving unit receives the issue application from the terminal device,
accesses an API (Application Programming Interface) of the end server by using the second login information used in the issue application received from the terminal device to log in to the end server, and
determines whether or not login to the end server is successful, an ID issuing unit that,
where the login is successful,
issues, to the terminal device, the first login information on a basis of the issue application, and
registers a combination of the issued first login information and the second login information provided from the terminal device in the ID correspondence table in a one-to-one correspondence, and an end server access receiving unit that
receives an access request from the terminal device, the access request requesting to access the end server by using the first login information and the second login information, and
where a combination of the first login information and the second login information in the access request is registered in the ID correspondence table, causes the end server accessing unit to access the end server.

2. The information processing system according to claim 1, wherein the ID issuing unit,
where the ID issue receiving unit receives the issue application, causes the end server accessing unit to log in to the end server by using the second login information that is used in the issue application, and
where login is successful, issues the first login information.

3. The information processing system according to claim 1, wherein
the end server access receiving unit, where a combination of the first login information and the second login information in the access request is not registered in the ID correspondence table, causes the end server accessing unit not to access the end server.

4. An information processing method executed by an information processing system including a terminal device, an end server, and an intermediate server connected to the terminal device and the end server via a network, the information processing method comprising:

by a controller of the intermediate server,
receiving an issue application using a second login information from the terminal device, the issue application being an application for issuing a first login information, the first login information being for logging in to the intermediate server by the terminal device, the second login information being for accessing an API (Application Programming Interface) of the intermediate server and logging in to the end server;
when receiving the issue application from the terminal device,
accessing an API (Application Programming Interface) of the end server by using the second login information used in the issue application received from the terminal device to log in to the end server;
determining whether or not login to the end server is successful,
where the login is successful,
issuing, to the terminal device, the first login information on a basis of the issue application;
registering a combination of the issued first login information and the second login information provided from the terminal device in the ID correspondence table in a one-to-one correspondence;
receiving an access request from the terminal device, the access request requesting to access the end server by using the first login information and the second login information; and
where a combination of the first login information and the second login information in the access request is registered in the ID correspondence table, accessing the end server.

* * * * *